United States Patent
Singh et al.

(10) Patent No.: US 9,769,723 B2
(45) Date of Patent: Sep. 19, 2017

(54) PERFORMING WIFI AND CELLULAR HANDOVER USING DEVICE-SPECIFIC THRESHOLDS

(71) Applicant: Apple Inc., Cupertino, CA (US)

(72) Inventors: Ajoy K. Singh, Milpitas, CA (US); Krisztian Kiss, Hayward, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/286,303

(22) Filed: Oct. 5, 2016

(65) Prior Publication Data

US 2017/0026884 A1    Jan. 26, 2017

Related U.S. Application Data

(62) Division of application No. 14/331,449, filed on Jul. 15, 2014, now Pat. No. 9,491,674.

(Continued)

(51) Int. Cl.
*H04W 36/00* (2009.01)
*H04W 36/14* (2009.01)
(Continued)

(52) U.S. Cl.
CPC ............ *H04W 36/14* (2013.01); *H04L 5/006* (2013.01); *H04L 43/0882* (2013.01);
(Continued)

(58) Field of Classification Search
None
See application file for complete search history.

(56) References Cited

U.S. PATENT DOCUMENTS 5,142,695 A  *  8/1992  Roberts .............. H03G 3/3052
                                                                    455/234.1
2004/0102158 A1     5/2004  Schwarz et al.
(Continued)

FOREIGN PATENT DOCUMENTS

GB            2456882        4/2008

OTHER PUBLICATIONS

Office Action, Taiwan Application No. 103125168, mailed Jan. 25, 2016, 11 pages.
(Continued)

*Primary Examiner* — Moustapha Diaby
(74) *Attorney, Agent, or Firm* — Meyertons Hood Kivlin Kowert & Goetzel, P.C.; Jeffrey C. Hood

(57) ABSTRACT

An apparatus, system, and method for performing handover of a mobile station (MS) between a base station (BS) and an access point (AP) are described. In one embodiment, the MS may receive one or more threshold values for reporting measurements to the BS. The MS may convert the threshold values to device-specific threshold values. The MS may determine one or more network quality values associated with the AP. The MS may compare the network quality values to the device-specific threshold values. In response to the network quality values exceeding the device-specific threshold values, the MS may convert the network quality values to calibrated network quality values. The MS may provide the calibrated network quality values. The MS may perform handover from the BS to the AP based on providing the calibrated network quality values to the BS.

20 Claims, 5 Drawing Sheets

Related U.S. Application Data

(60) Provisional application No. 61/857,501, filed on Jul. 23, 2013.

(51) Int. Cl.

| | | |
|---|---|---|
| *H04W 36/08* | (2009.01) | |
| *H04W 36/30* | (2009.01) | |
| *H04W 36/22* | (2009.01) | |
| *H04W 36/24* | (2009.01) | |
| *H04L 5/00* | (2006.01) | |
| *H04L 12/26* | (2006.01) | |
| *H04L 12/801* | (2013.01) | |
| *H04W 28/02* | (2009.01) | |
| *H04W 36/36* | (2009.01) | |
| *H04W 84/04* | (2009.01) | |
| *H04W 84/12* | (2009.01) | |

(52) U.S. Cl.
CPC .......... *H04L 43/0894* (2013.01); *H04L 47/29* (2013.01); *H04W 28/0268* (2013.01); *H04W 36/0083* (2013.01); *H04W 36/08* (2013.01); *H04W 36/22* (2013.01); *H04W 36/24* (2013.01); *H04W 36/30* (2013.01); *H04W 36/36* (2013.01); *H04W 84/042* (2013.01); *H04W 84/12* (2013.01)

(56) References Cited

U.S. PATENT DOCUMENTS

| | | | |
|---|---|---|---|
| 2005/0221828 | A1 | 10/2005 | Wakuta et al. |
| 2007/0218906 | A1* | 9/2007 | Melia ................ H04W 36/30 455/436 |
| 2008/0101318 | A1 | 5/2008 | Taaghol et al. |
| 2008/0244095 | A1 | 10/2008 | Vos et al. |
| 2009/0028112 | A1 | 1/2009 | Attar et al. |
| 2010/0130202 | A1 | 5/2010 | Yu |
| 2010/0159934 | A1 | 6/2010 | Forssell |
| 2010/0184434 | A1 | 7/2010 | Jeong et al. |
| 2012/0108288 | A1 | 5/2012 | Montemurro et al. |
| 2012/0208540 | A1 | 8/2012 | Kim et al. |
| 2012/0315905 | A1 | 12/2012 | Zhu et al. |
| 2013/0242965 | A1 | 9/2013 | Horn et al. |
| 2013/0260757 | A1* | 10/2013 | Deivasigamani ..... H04W 24/00 455/435.3 |
| 2014/0162656 | A1 | 6/2014 | Chai et al. |
| 2014/0187252 | A1* | 7/2014 | Gupta ................ H04W 48/18 455/450 |
| 2015/0189557 | A1* | 7/2015 | Touati ............... H04W 36/0066 370/332 |

OTHER PUBLICATIONS

International Preliminary Report on Patentability, Application No. PCT/US2014/046701, mailed Oct. 16, 2015, 11 pages.

International Search Report and Written Opinion from PCT/US2014/046701, Issued Nov. 4, 2014, Apple Inc., pp. 1-13.0.

3GPP TS 36.331, "3rd Generation Partnership Project; Technical Specification Group Radio Access Network; Evolved Universal Terrestrial Radio Access (E-UTRA); Radio Resource Control (RRC); Protocol Specification", Jun. 2013, pp. 1-346.

Written Opinion of the International Preliminary Examining Authority from PCT/US2014/046701, Issued Jun. 15, 2015, Apple Inc., pp. 1-6.

* cited by examiner

PERFORMING WIFI AND CELLULAR HANDOVER USING DEVICE-SPECIFIC THRESHOLDS

PRIORITY INFORMATION

This application is a divisional of U.S. patent application Ser. No. 14/331,449 titled "Performing WiFi and Cellular Handover Using Device-Specific Thresholds" and filed on Jul. 15, 2014, whose inventors are Ajoy K. Singh, Krisztian Kiss, and Wen Zhao, which claims benefit of priority to provisional patent application No. 61/857,501, entitled "Performing WiFi and Cellular Handover using Device-Specific Thresholds", filed on Jul. 23, 2013, whose inventors are Ajoy K. Singh, Krisztian Kiss, and Wen Zhao, all of which are hereby incorporated by reference in their entirety as if fully and completely set forth herein.

FIELD OF THE DISCLOSURE

The present application relates to wireless communication, and more particularly to an apparatus, system, and method for performing Wi-Fi and Cellular Handover.

DESCRIPTION OF THE RELATED ART

Wireless communication systems are rapidly growing in usage. In particular, there are a large variety of wireless technologies that are presently in use for providing data and voice communications for wireless devices. For example, a personal wireless device, such as a cell phone, may use both cellular wireless communication technology (such as long term evolution (LTE)) as well as another wireless communication technology (such as Wi-Fi/802.11).

Accordingly, some wireless data plan providers may install both cellular base stations as well as access points supporting other wireless communication technologies (e.g., Wi-Fi access points) in order to better support their users. In such systems, it may be desirable to control handover between a cellular base station and an access point. However, while reporting radio measurement values of cellular mobile devices and base stations are standardized and well-defined, and therefore allow for a straight-forward handover between cellular base stations, the radio measurement values for access point (AP) mobile devices and APs (e.g., WiFi mobile devices and APs) are not well defined. In particular, the radio values reported by one type of wireless device may not translate to the same value for the same situation by another type of wireless device. These inconsistencies result in a problematic handover decision between cellular base stations and access points.

SUMMARY

Embodiments described herein relate to an apparatus, system, and method for performing handover of a mobile station (MS) between a base station (BS) and an access point (AP).

In one embodiment, a method may include receiving one or more threshold values for reporting measurements of the AP to the BS. The method may further include converting the threshold values to device-specific threshold values. The method may further include determining one or more network quality values associated with the AP. The method may also include comparing the one or more network quality values to the device-specific threshold values. In response to the one or more network quality values exceeding the device-specific threshold values, the method may include: converting the one or more network quality values to one or more calibrated network quality values, providing the one or more calibrated network quality values, and performing handover between the BS and the AP based on providing the one or more calibrated network quality values to the BS.

In one embodiment, the MS may include one or more radios, coupled to one or more antennas configured for wireless communication, and a processing element operably coupled to the one or more radios. The MS may be configured to, e.g., via the processing element and the one or more radios, receive one or more threshold values for reporting measurements of the AP to the BS. The MS may further determine one or more network quality values associated with the AP. The MS may convert the one or more network quality values to one or more calibrated network quality values. The MS may compare the one or more calibrated network quality values to the one or more threshold values. Finally, the MS may perform handover based on the comparing.

In one embodiment, a BS may include one or more radios, coupled to one or more antennas configured for wireless communication, and a processing element operably coupled to the one or more radios. The BS may be configured to, e.g., via the processing element and the one or more radios, receive one or more network quality values associated with the AP from the MS. The BS may convert the one or more network quality values to one or more calibrated network quality values based on a type of the MS. The BS may compare the one or more calibrated network quality values to the one or more threshold values. Finally, in response to the one or more calibrated network quality values exceeding the one or more threshold values, the BS may provide a handover command to the MS to perform handover between the BS and the AP.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings.

Figure 1:
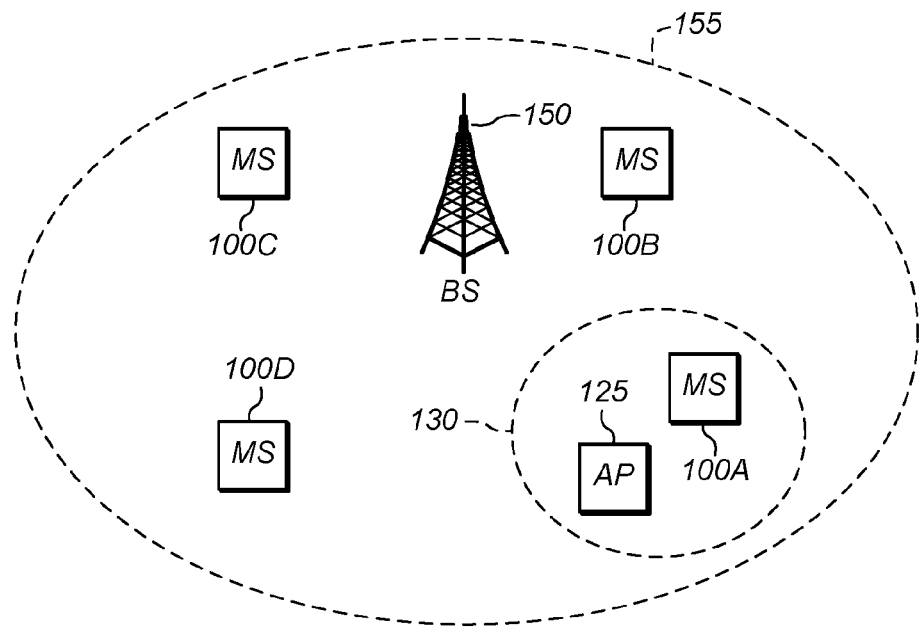
FIG. 1 illustrates an exemplary wireless communication system including multiple user devices, a base station, and an access point within the coverage area of the base station, according to one embodiment.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. This definition also applies to the term "mobile station" (or mobile stations).

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
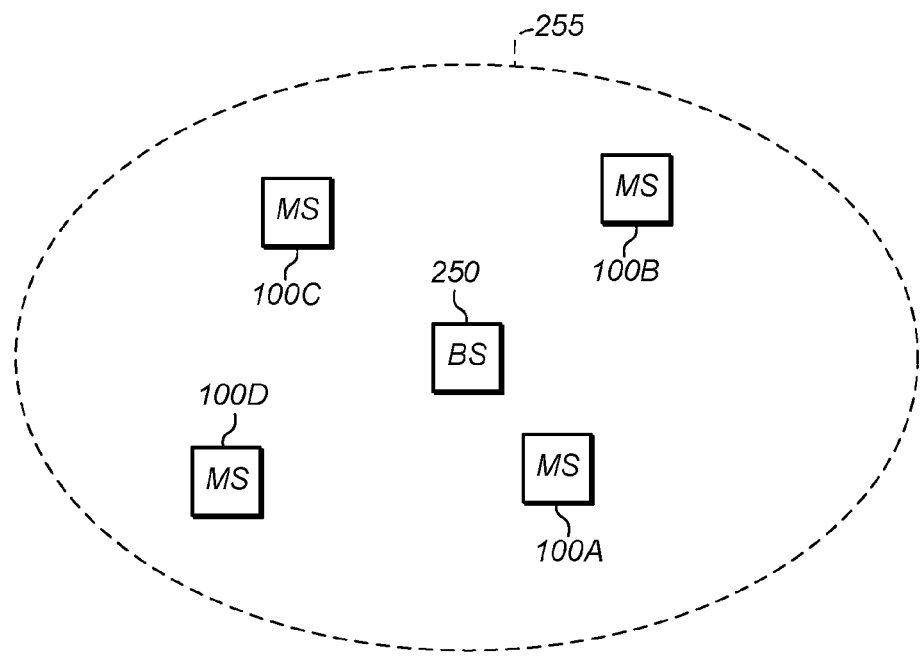
FIG. 2 illustrates an exemplary wireless communication system where a base station supports both cellular and local area wireless technologies, according to one embodiment.

FIGS. 1 and 2—Exemplary Communication Systems

FIGS. 1 and 2 illustrate exemplary (and simplified) wireless communication systems. It is noted that the systems of FIGS. 1 and 2 are merely examples of possible systems, and embodiments may be implemented in any of various other systems, as desired.

As shown in FIG. 1, the exemplary wireless communication system includes a base station (BS) 150 which communicates over a transmission medium with one or more User Equipment (UE) (or "UE devices") or mobile stations (MS) 100A through 100D. All of the MS 100A-D are within the coverage area 155 of the BS 150. In addition, MS 100A is also within the smaller coverage area of access point (AP) 125. Each of the MSs 100A-100D may be referred to representatively as "MS 100".

The base station 150 may be a base transceiver station (BTS), base station controller (BSC), evolved node B (eNB), etc. The base station may be a cellular base station housed within a cell tower, e.g., among one or more other base stations. The base station 150 may include hardware that enables wireless communication with the MSs 100A-D. The base station 150 may also be equipped to communicate with a core network. Thus, the base statation 150 may facilitate communication between the MSs 100A-100D and/or between the MSs 100A-100D and the core network. The communication area (or coverage area) of the BS 150 may be referred to as a "cell." The base station 150 and the MS 100A-100D may be configured to communicate over the transmission medium using any of various wireless communication technologies, e.g., cellular communication protocols, such as GSM, CDMA, WiMAX, LTE, etc. In some embodiments, the BS 150 may be a multi-mode base station which is configured to support multiple wireless communication technologies (e.g., LTE and CDMA, LTE and GSM, etc.).

Similarly, the AP 125 may support wireless communication, e.g., according to a different wireless communication protocol than provided by the BS 150, within the smaller coverage area 130 provided by the AP 125. For example, in one embodiment, the AP 125 may provide wireless communication using an 802.11 protocol (e.g., 802.11 a, b, g, ac, n, etc.), although other types of wireless communication protocols are envisioned, such as Bluetooth or other short to medium range wireless communication protocols. The AP 125 may also provide connectivity to the core network or simply provide network connectivity to the Internet. In some embodiments, the BS 150 and AP 125 may be provided or supported by the same service provider, although other embodiments are envisioned.

The BS 150, the AP 125, and/or MS 100A may operate in the manner described herein to coordinate handover of the MS 100A between the BS 150 and the AP 125, according to some embodiments.

FIG. 2 illustrates a different wireless communication system where a BS 250 provides a coverage area 255, in which MS 100A-100D operate. In the exemplary embodiment of FIG. 2, the BS 250 may support multiple wireless communication protocols. For example, the BS 250 may support both cellular communication technologies as well as other wireless technologies, such as 802.11 (although other wireless protocols, such as Bluetooth, are envisioned).

Although the BS 250 is labeled as a "base station" it may be any sort of device having the capabilities enumerated in the preceding paragraph. For example, the BS 250 may be a femtocell or other type of access point, as desired. In one embodiment, the BS 250 and MS 100A may coordinate handover between cellular communication and the other wireless communication protocols, e.g., according to the methods described below.

Figure 3:
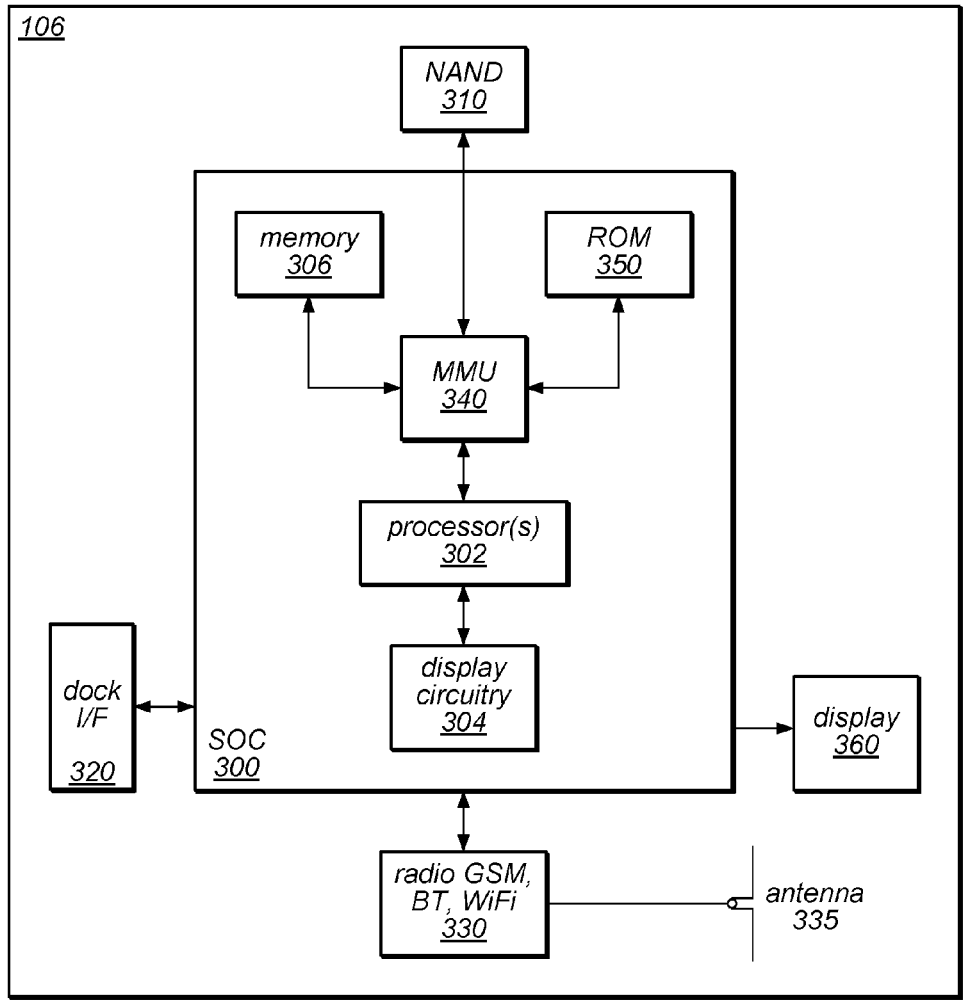
FIG. 3 illustrates an exemplary block diagram of a UE device, according to one embodiment.

FIG. 3—Exemplary Block Diagram of a MS

FIG. 3 illustrates an exemplary block diagram of the MS 100. As shown, the MS 100 may include a system on chip (SOC) 300, which may include portions for various purposes. For example, as shown, the SOC 300 may include processor(s) 302 which may execute program instructions for the MS 100 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. The MMU 340 may be included as a portion of the processor(s) 302.

As also shown, the SOC 300 may be coupled to various other circuits of the MS 100. For example, the MS 100 may include various types of memory (e.g., including NAND flash 310), a connector interface 320 (e.g., for coupling to the computer system), the display 360, and wireless communication circuitry 330 (e.g., for LTE, CDMA, GSM, Bluetooth, WiFi, etc.) which may use antenna 335 to perform the wireless communication. A single radio within the communication circuitry 330 may be used to communicate with multiple cellular networks (e.g., LTE, CDMA, GSM, etc. networks, among other types), although multiple radios are also envisioned. In one embodiment, the same radio may be used to communicate with a first wireless network (e.g., a fourth generation wireless network, such as LTE) and a second wireless network (e.g., a WiFi or 802.11 wireless network). Alternatively, the MS 100 may include one or more cellular radios and one or more radios for other communication standards, such as WiFi and/or Bluetooth, among other possibilities. As discussed below, the MS 100 may be involved in handover between a cellular base station and an access point, such as a WiFi access point.

The hardware and/or software of the MS 100 may be used to implement various embodiments described herein.

Figure 4:
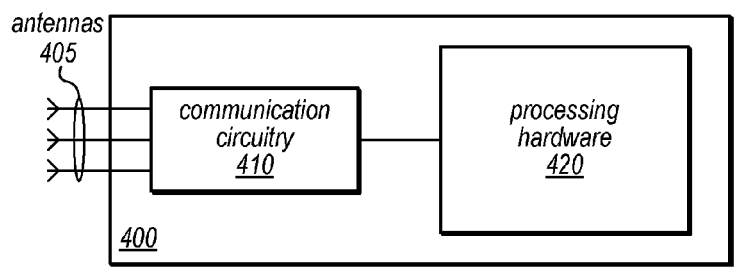
FIG. 4 illustrates an exemplary block diagram of a wireless access device, according to one embodiment.

FIG. 4—Exemplary Diagram of a Wireless Access Device

FIG. 4 illustrates a simplified diagram of a wireless access device 400 that provides wireless communication for one or more mobile stations. For example, the wireless access device 400 may correspond to the BS 150 or the AP 125, as desired.

As shown, the wireless access device 400 may include one or more antennas 405, which may enable the wireless access device 400 to transmit various radio signals, e.g., for communicating with the MS 100. The antennas 405 may be coupled to communication circuitry 410, which may perform various processing on signals that are received via the antennas 405 or are to be transmitted via the antennas 405. Additionally, the communication circuitry may be coupled to processing hardware 420, which may control operation of the wireless access device 400. The processing hardware 420 may comprise one or more processors (e.g., central processing units) and memory mediums, e.g., storing program instructions executed by the processors. Additionally, or alternatively, the processing hardware may include one or more programmable hardware elements (e.g., field programmable gate arrays (FPGAs)) and/or application specific integrated circuits (ASICs). This processing hardware 420 may be configured to control the wireless access device 400 to perform various embodiments described herein.

Mobile Station Handover Between Access Point and Base Station

Handovers of mobile stations between cellular base stations are generally effective because radios of various cellular devices are calibrated to provide signal quality measurements as per various specifications (e.g., 3GPP). In particular, cellular handover algorithms may be based on relative received signal strength, hysteresis, and/or thresholds. For example, the mobile stations may report RSRP (reference signal received power), RSCP (received signal code power), or RSRQ (reference signal received quality) measurements, among other possibilities, and the measurements reported by two different devices from two different vendors will generally have the same meaning. As a result, between cellular base stations, a handover algorithm can trust measurements reported by various devices and make handover decisions based on the reported measurement reports.

However, due to lack of WiFi calibration standards, the above assumptions cannot be made for WiFi radios. For example, it is possible that a RSSI (received signal strength indicator) of −75 dbm reported by two different devices would have different meanings. As a result, a handover algorithm using reported WiFi values cannot simply make handover decisions by comparing radio measurements of two different devices from different vendors, unless some mechanism is put in place to address the inconsistencies of signal measurements reported by various WiFi radios.

Such mechanisms may be particularly useful for handover between access points (e.g., 802.11 access points) and cellular base stations. These access points may be collocated or non-collocated with base stations, as desired. In some embodiments, the access points may be managed by a service provider or operator of the base stations, or not, as desired. Regardless, there may be situations where the base stations or radio network controllers (RNCs) may know the location, presence or other information (BSSID, Channel, etc.) of APs in their coverage area.

In one embodiment, handover between APs and BSs may be controlled by the mobile station. For example, the radio access network (RAN) may provide assistance information to the mobile station, e.g., which may include network load information (e.g., BS load information) that may be broadcasted by the BS(s). Based on this information, and rules provided, e.g., by access network detection and selection function (ANDSF) (e.g., not by the RAN), the mobile station may steer traffic to the AP or BS. Such an embodiment may be particularly applicable to mobile stations in RRC IDLE and RRC CONNECTED states for E-UTRAN, UE IDLE mode for UTRAN, and CELL_DCH, CELL_FACH, CELL_PCH and URA_PCH states for UTRAN. It may also be applicable to UEs in IDLE mode and CELL_PCH and URA_PCH states.

Additionally, or alternatively, the RAN may provide access network selection parameters (e.g. thresholds, priorities, rules, etc.) to the MS. Based on these parameters, the MS may steer traffic to an AP or BS. Such embodiments may be particularly applicable to mobile stations in RRC IDLE and RRC CONNECTED states for E-UTRAN, UE IDLE mode for UTRAN, and CELL_FACH, CELL_PCH, URA_PCH and CELL_DCH states for UTRAN.

In idle mode, the MS may use broadcasted information (e.g., SIB information) while in connected mode, the MS may use information provided by the BS (e.g., based on capability information provided by the MS to the BS).

In one embodiment, handover may be controlled by the network. For example, traffic steering for MSs (e.g., in RRC CONNECTED/CELL_DCH state) may be controlled by the network using dedicated traffic steering commands (e.g., steering vectors), potentially based also on AP measurements by MSs. In one embodiment, the BS and/or RNC may configure the MS measurement procedures, e.g., including the identity of the target AP to be measured (e.g., SSID of the WLAN AP). The MS may be configured to send a measurement report based on the rules set by the measurement control.

For example, measurement control may specify candidate measurement events to trigger reporting by the MS. For example, events may include: W1: AP becomes better than a threshold—traffic steering to AP, W2: AP becomes worse than a threshold—traffic steering from AP, W3: BS radio quality becomes worse than threshold 1 and AP radio quality becomes better than threshold2—traffic steering to WLAN, and W4: AP radio quality becomes worse than threshold 1 and BS radio quality becomes better than threshold 2—traffic steering from WLAN. In response to such triggering events (although others are envisioned), the MS may transmit a measurement report.

The measurement report may include various metrics. For example, the measurement report may include AP RCPI (Received Channel Power Indicator), e.g., a measure of the received RF power in the selected channel for a received frame in the range of −110 to 0 dBm. The measurement report may include AP RSNI (Received Signal to Noise Indicator), e.g., an indication of the signal to noise plus interference ratio of a received frame (e.g., an IEEE 802.11 frame). The RSNI may be defined by the ratio of the received signal power (RCPI-ANPI) to the noise plus interference power (ANPI) in steps of 0.5 dB in the range from −10 dB to +117 dB. The measurement report may include AP load, e.g., basic service set (BSS) load, e.g., which may include information on the current STA population and traffic levels in the BSS. Such information may be available in Beacon or Probe Response (802.11k). The measurement report may include WAN metrics, e.g. including estimates of DL and UL speeds of the AP and loading as well as link status and whether the WLAN AP is at capacity, e.g., which may be available in ANQP in Hotspot 2.0.

In response to the measurement report, the BS and/or RNC may transmit a steering command message (e.g., a steering vector) to the MS to perform the traffic steering based on the reported measurements and/or loading in the RAN (e.g., BS load). A candidate identifier of the traffic to steer may be the DRB/RB-ID (identity of a radio bearer) or the QCI (QoS Class Identifier), as desired.

The following provides one exemplary steering use case. Initially, a MS may be connected to 3GPP RAN and sending data traffic. The 3GPP RAN may determine that offloading to WLAN is suitable for this MS and that an AP exists in the coverage area. Accordingly, the RAN may configure the MS to report one or more APs, e.g., using event W1 with RSNI above a threshold (e.g., discussed above). The MS may perform measurements to find the relevant APs and may trigger an indication when an event occurs, reporting the measurement to the RAN. The RAN may evaluate if bearers should be moved to the AP and issue a traffic steering command to the MS. Accordingly, the MS may steer some or all the traffic to the AP based on the command.

As previously discussed, the values reported by the MS may not be typically standardized or calibrated, and accordingly, without adjustment, may lead to incorrect handover decisions, e.g., by the MS and/or by the BS or RAN.

In one embodiment, the MS may be configured to map raw measurements to calibrated measurements values using rules (e.g., 3GPP rules) before sending the measurement reports to the BS or RAN. As one example, the device may convert various thresholds values reported by the network in RRC messages or ANDSF policies to meaningful values (device-specific values) before using these thresholds in device-handover related decision making. For example, 3GPP could publish a range of calibrated RSSI, SNR, RCPI or RSNI, etc. values along with its expected behavior. Accordingly, individual MSs may map its measured RSSI and SNR values to calibrated values before reporting radio metrics to the BS or RAN. Said another way, given that each MS may know its performance at different RSSI, SNR, etc. values, it may utilize this information to map its measured RSSI, SNR, etc. values to calibrated RSSI, SNR, etc. values. Thus, rather than reporting measured values, the MS may report calibrated value(s) to the network.

Additionally, or alternatively, rather than sending measured radio metrics, each device may send calibrated performance indicators to the network. In one embodiment, for system-level AP performance indicators, the MS may evaluate performance of AP links and report the AP link performance to the network. For example, the MS may determine the expected AP performance metrics by evaluating some the following metrics: measured RSSI, measured SNR, beacon rate, MAC layer retransmission thresholds, AP load, etc. In one embodiment, the performance indicator may be used having a range from 1 to 100. A MS may transmit a calibrated performance indicator according to the following meanings: 100—Best performance, 75—Good performance, 50—Fair performance, 25—Bad performance. Other ranges or indicators are also envisioned.

Alternatively, the network may receive uncalibrated values from various devices and may calibrate these values before utilizing them in handover decisions. For example, the network (e.g., the BS or RAN) may identify a device type of the MS (e.g., based on capabilities of the MS, information reported by the MS, etc.). For example, the network may utilize basic understanding of performance characteristic of individual device types. In one embodiment, the network may implement this device type calibration for a few well known devices and may attempt to approximate other device types.

While various descriptions herein may be referenced as specific to 802.11, they may also apply to any other handover situation, e.g., between cellular and non-cellular communication protocols, as desired.

Figure 5:
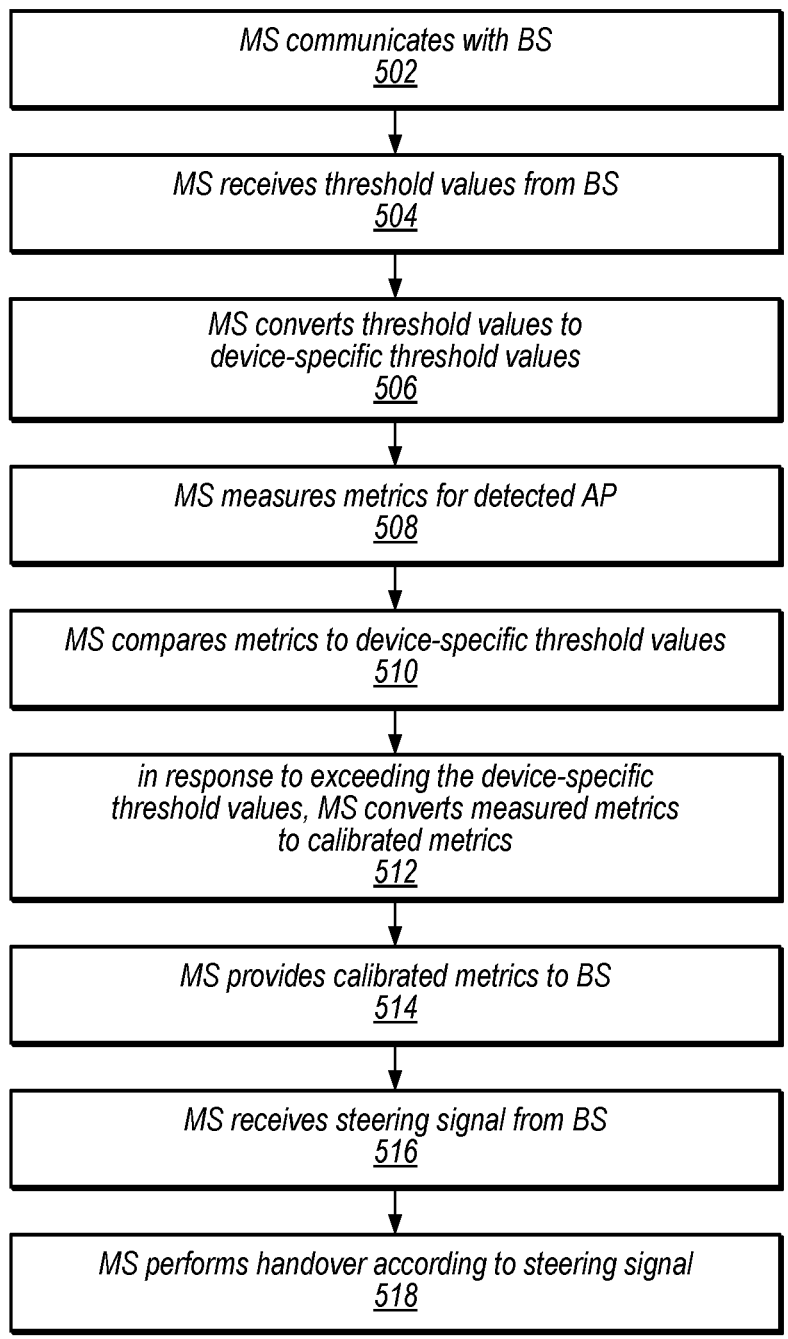
FIG. 5 is a flowchart diagram illustrating one embodiment of a method for performing handover of a MS between a BS and AP involving calibration of radio measurements by the MS.

FIG. 5—Network Controlled Handover Between a Base Station and Access Point

FIG. 5 illustrates an exemplary method for performing handover of a MS between a BS and an AP under the control of the network. This method may be extended to handover between two different wireless protocols provided by a same BS. The method shown in FIG. 5 may be used in conjunction with any of the computer systems or devices shown in the above Figures, among other devices. In various embodiments, some of the method elements shown may be performed concurrently, in a different order than shown, or may be omitted and/or considered optional. Additional method elements may also be performed as desired. As shown, this method may operate as follows.

In 502, a MS may be currently serviced by a BS or an AP, or in one embodiment, both. For example, the MS may have performed initial connection set-up with the BS or the AP in order to communicate with a network, such as the Internet, or for other voice or data services.

In 504, threshold values may be provided to the MS via the BS. For example, if the MS is currently connected to the BS for communicating data traffic, the BS may provide this threshold values to the MS. Similarly, if the MS is currently connected to the AP, then the threshold values may be received via the BS. In one alternative embodiment, the threshold values may be provided via the AP, e.g., from a service provider associated with the BS and/or AP via the network provided by the AP.

For the remainder of the description of this flowchart, it will be assumed the MS is serviced by a BS rather than an AP, but the method may be modified for the opposite case as well. For example, while the communications discussed in FIG. 7 relate to communications between the MS and the BS, they may be between the MS and the AP. Alternatively, the communications may still be between the MS and the BS, but the MS may be connected to the AP instead of the BS (e.g., the BS may control handover in both directions, if desired).

The threshold values may be used to determine when to report measured radio signals, e.g., to the BS or network for deciding whether the MS should perform a handover. For example, the threshold values may specify when the MS should report detected wireless networks provided by APs or required signal strengths of measured radio signals of neighboring AP(s). The thresholds may specify threshold values for individual radio measurements, such as RSSI, SNR, SINR, RSRP, RSRQ, RSCP, AP load, WAN metrics, etc. Alternatively, the thresholds specified in the handover policy information may indicate overall or combined metrics, e.g., based on several individual radio measurements.

In 506, the MS may convert the received threshold values to values that are specific to the MS, e.g., device-specific threshold values. For example, the MS may use mapping tables which converts the threshold values provided in the handover policy information to device-specific threshold values that are meaningful for the MS, since each different type of MS may measure radio signals in different manners, e.g., radio signals of AP stations. As an example, a first type of MS may detect an RSSI value of a nearby AP as a first value, whereas a second type of MS, in the same condition, may detect a different RSSI value. Additionally, each MS may consider the same RSSI values as different in levels of quality. Accordingly, each MS may be configured to convert the provided threshold values into values that are consistent with the manner in which the MS measures radio signals, e.g., from the AP.

The conversion may use a mapping table, e.g., mapping individual values or ranges of values for the thresholds into individual values or ranges of values for radio measurement thresholds that are specific to the device. Alternatively, an algorithm (e.g., numeric formula) may be used to convert the received threshold values to individual threshold values.

In 508, the MS may determine metrics of the wireless network provided by the AP, e.g., using signals transmitted by the AP. Thus, in 508, the MS may be within the service area of both the BS and the AP. The metrics may include RSSI, SNR, SINR, AP load, AP backhaul load, beacon rate, MAC layer retransmission thresholds, WAN metrics, etc. Alternatively, or additionally, the MS may generate a combined metric or a performance indicator of the AP using one or more of the metrics described above. These metric(s) and/or performance indicator(s) may be referred to collectively as "network quality values".

In 510, the MS may compare one or more of the metrics (or simply the performance indicator) to the device-specific threshold(s) generated in 506. If the metrics do not trigger the reporting event (e.g., by exceeding the device-specific threshold), then the method may repeat 508 and 510 periodically.

In 512, in the case where the reporting event is triggered, the current metric(s) or performance indicator(s) may be converted to calibrated metric(s) or performance indicator(s), e.g., using the mapping or algorithm discussed above in 506, except in the reverse direction. That is, the device-specific values measured in 508 may be converted to values that are reportable to the BS, which may be referred to as "calibrated values" or "calibrated metrics".

In 514, the calibrated metric(s) or performance indicator(s) may be provided to the BS.

In 516, in response to the calibrated metric(s) or performance indicator(s), the MS may receive a steering command, e.g., from the BS or generally from the service provider associated with the BS and/or AP. For example, the BS or another network device, may analyze the metric(s) or performance indicator(s) and determine if a handover should be performed, e.g., using handover policy information. The handover policy information may indicate under what conditions handover should be performed, e.g., using thresholds.

The steering command may indicate that one or more data flows (or bearers) or applications should be handed over from the BS to the AP or vice versa. In some embodiments, the steering command may indicate a full handover should be performed or that only a subset of the data flows should be handed over from or to the AP, as desired. In more detail, the steering command may indicate that the MS should switch from communicating current and future data communications using the BS to communicating current and future data communications using the AP. Alternatively, the steering command may indicate that only a portion of the current and future data communications should be switched from the BS to the AP. For example, certain services or applications may be indicated as being assigned to the BS while other services or applications may be indicated as being assigned to the AP. In one embodiment, this assignment may be based on the quality of service required by each service or application. For example, where services or applications having higher requirements of QoS, such as voice or video communication, are assigned to one of the BS or the AP, and services or applications having lower QoS requirements, such as general data communication, are assigned to the other of the BS or the AP.

Note that one or more of the steps described above may not need to be performed. For example, 504, 506, and 510 may not need to be performed, e.g., the device may simply report the calibrated metrics in 514 without needing to compare to received and converted thresholds from the network, e.g., according to its own reporting policies.

Additionally, while the above method describes conversion of the thresholds to device-specific values, the opposite may be performed, where measured values are converted and compared to the original threshold. Accordingly, in such an embodiment, those already converted measured values could be provided in 514. In particular, in one such an embodiment, the method may include: receiving one or more threshold values for reporting measurements of an access point (AP) to a base station (BS) (e.g., similar to 504), determining one or more network quality values associated with the AP (e.g., similar to 508), converting the one or more network quality values to one or more calibrated network quality values (e.g., similar to 512), comparing the one or more calibrated network quality values to the one or more threshold values (e.g., similar to 510, except using calibrated network quality values rather than uncalibrated network quality values), and performing handover based on the comparing (e.g., similar to 514 and 516).

Figure 6:
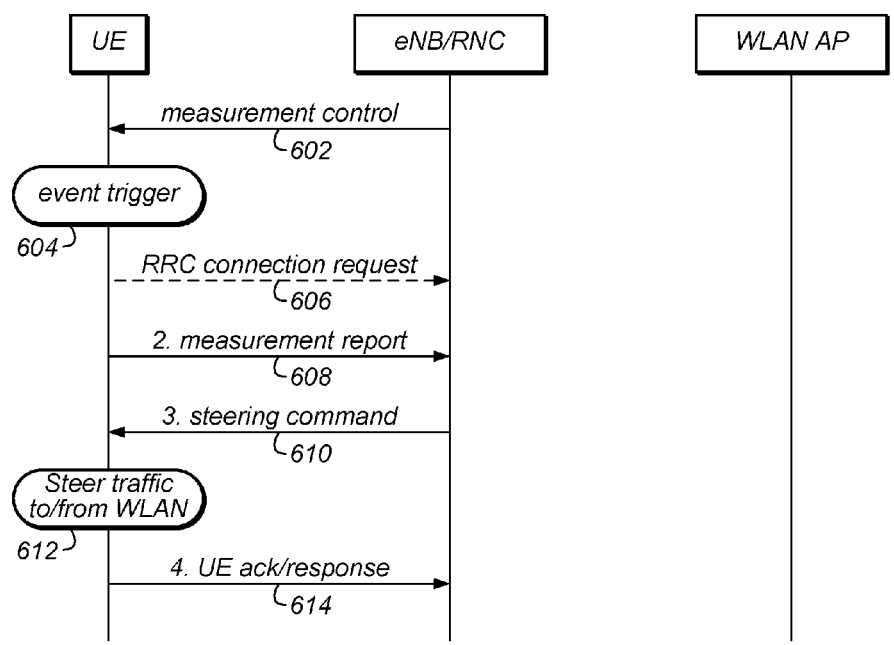
FIG. 6 illustrates exemplary message flow between a MS and a BS according to one embodiment of FIG. 5.

FIG. 6—Exemplary Message Flow Corresponding to one Embodiment of FIG. 5

FIG. 6 illustrates an exemplary message flow corresponding to one embodiment of FIG. 5.

In 602, a measurement control message indicating thresholds for reporting values is provided from the BS to the UE.

In 604, an event is triggered, corresponding to the thresholds of 602.

In 606, the UE sends a connection request to the BS.

In 608, the UE sends a measurement report to the BS, including calibrated measurements.

In 610, the BS sends a steering command to the UE for controlling handover of one or more data flows of the UE (e.g., for individual or classes of services or applications executed by the UE).

In 612, the UE performs handover according to the steering command.

In 614, the UE transmits an acknowledgement to the BS.

Figure 7:
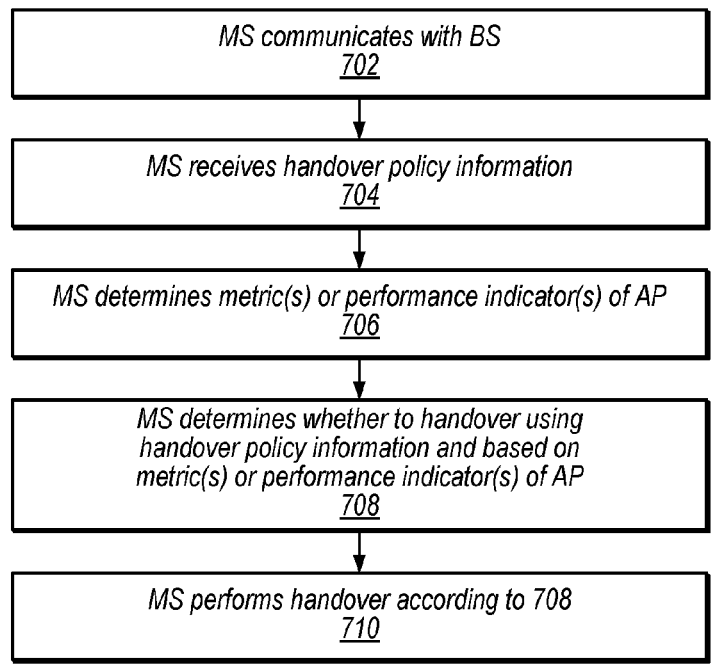
FIG. 7 is a flowchart diagram illustrating one embodiment of a method for performing handover of a MS between a BS and AP that is controlled by the MS.

FIG. 7—Mobile Station Controlled Handover Between a Base Station and Access Point FIG. 7 illustrates an exemplary method for performing handover of a MS between a BS and an AP under the control of the mobile station according to a handover policy provided by the network. This method may be extended to handover between two different wireless protocols provided by a same BS. The method shown in FIG. 7 may be used in conjunction with any of the computer systems or devices shown in the above Figures, among other devices. In various embodiments, some of the method elements shown may be performed concurrently, in a different order than shown, or may be omitted and/or considered optional. Additional method elements may also be performed as desired. As shown, this method may operate as follows.

In 702, a MS may be serviced by an AP or BS, similar to 502 above.

In 704, handover policy information may be provided to the MS via the BS or the AP. For example, if the MS is currently connected to the BS, the BS may provide this handover policy information to the MS. If the MS is currently connected to the AP, then policy information may be received via the BS. Alternatively, in one embodiment, if the MS is connected to the AP, then the policy information may be retrieved via the AP, e.g., from a service provider associated with the BS and/or AP via the network provided by the AP.

The handover policy information may indicate under what conditions the MS should perform handover of all or some of the data flows, e.g., from the BS to the AP, or from the AP to the BS, as desired. In one embodiment, the handover policy information may include the thresholds discussed in FIG. 5, e.g., so that the MS may perform handover when the thresholds are exceeded, e.g., without having to receive a steering command from the BS (or generally from the service provider of the network).

As in FIG. 5, while embodiments are described where the MS is initially serviced by the BS, the descriptions may be modified to suit the case where the MS is initially serviced by the AP. For example, while the communications discussed in FIG. 7 relate to communications between the MS and the BS, they may be between the MS and the AP. Alternatively, the communications may still be between the MS and the BS, but the MS may be connected to the AP instead of the BS (e.g., the BS may control handover in both directions, if desired).

In 706, the MS may determine metric(s) or performance indicator(s).

In 708, the MS may determine whether to handover one or more (or all) of data (or voice) flows according to the handover policy information and based on the determined metric(s) or performance indicator(s). For example, the MS may convert the metric(s) or indicator(s) to calibrated values and compare those values to thresholds indicated in the handover policy information. Alternatively, the MS may have already converted such thresholds to device-specific values and compare the metric(s) or performance indicator(s) to the converted thresholds to determine whether to perform handover.

In 710, the MS may perform handover according to the decision in 708.

While FIG. 7 is described as using handover policy information provided from the network (e.g., via the BS or AP), in further embodiments, the MS may already have a handover policy and such provision and conversions of thresholds may not be necessary. In such embodiments, it may be possible for the MS to receive a new or updated handover policy, e.g., from a service provider of the BS and/or AP or from the device manufacturer of the MS.

Figure 8:
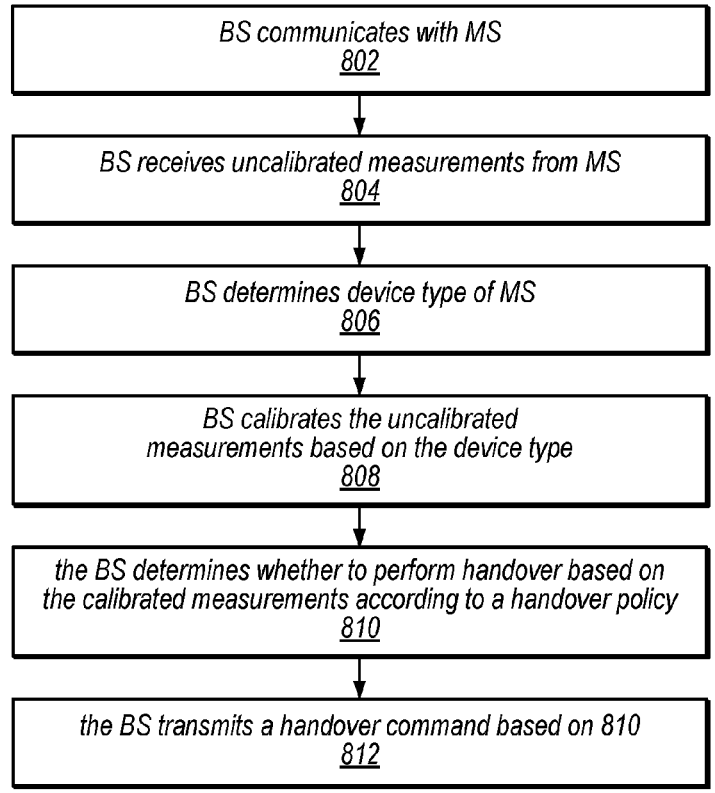
FIG. 8 is a flowchart diagram illustrating one embodiment of a method for performing handover of a MS between a BS and AP involving translation of radio measurements by the BS.

FIG. 8—Network Controlled Handover Between a Base Station and Access Point

FIG. 8 illustrates an exemplary method for performing handover of a MS between a BS and an AP under the control of the network. This method may be extended to handover between two different wireless protocols provided by a same BS. The method shown in FIG. 8 may be used in conjunction with any of the computer systems or devices shown in the above Figures, among other devices. In various embodiments, some of the method elements shown may be performed concurrently, in a different order than shown, or may be omitted and/or considered optional. Additional method elements may also be performed as desired. As shown, this method may operate as follows.

Although the below embodiments are described from the point of view of a BS, where the handover is from the BS to the AP, the method may be extended to the opposite case, from the point of view of the AP, where the handover is from the AP to the BS. For example, while the communications discussed in FIG. 8 relate to communications between the MS and the BS, they may be between the MS and the AP. Alternatively, the communications may still be between the MS and the BS, but the MS may be connected to the AP instead of the BS (e.g., the BS may control handover in both directions, if desired).

In 802, a BS may be in communication with a MS.

In 804, the BS may receive uncalibrated measurements (e.g., the network quality values previously discussed) from the MS.

In 806, the BS may identify the type of device of the MS. In some embodiments, the BS may identify the type of device via various messages or identifiers provided by the MS. For example, the type may be inferred from the IMSI or other identifier information comprised in messages from the MS. Alternatively, or additionally, the MS may simply identify its device type to the BS within one or more messages. Note that device type may be as granular as devices having the same brand name and version name, but having different radio chips (e.g., different WiFi communication chips).

In 808, the BS may calibrate the uncalibrated measurements based on the identity of the type of device of the MS. More specifically, in one embodiment, the BS may convert the uncalibrated measurements (e.g., the received network quality values) to one or more calibrated network quality values based on the type of device of the MS.

In 810, the BS may determine whether to perform handover based on the calibrated measurements according to a handover policy. In particular, the BS may compare the one or more calibrated network quality values to one or more threshold values.

In 812, the BS may transmit a handover command (e.g., a steering command) to the MS based on 810. For example, the BS may provide the handover command in response to the one or more calibrated network quality values exceeding the one or more threshold values.

In one embodiment, the method of FIG. 8 may be performed for each type of MS device. However, it may be possible to only perform the method for a few commonly used device types. In such scenarios, the network or BS may be able to use the calibrated measurements of those device types as a proxy for other MS in the same area that are not of the commonly used device types. Thus, the BS or network may be able to make approximated handover decisions for devices that are uncalibrated by analyzing calibrated measurements of a few types of devices. Note that such approximated handover decisions may involve comparison of the location of the devices whose measurements have been calibrated to those devices which have not been calibrated. For example, the handover decision may only apply if a device whose measurements are not calibrated are sufficiently close to another device whose measurements have been calibrated.

Further Embodiments

In addition to the embodiments described above, various further embodiments are envisioned.

For example, in one embodiment, the handover decision may take into account the types of data plans associated with the user of the MS. For example, a bias may be applied to Wi-Fi APs rather than BSs when the data plan associated with the MS is limited or when the remaining data for the month has reached a lower threshold. Thus, a user with unlimited data may simply use the best available AP or BS, whereas a user with limited data may preferentially use an AP (e.g., such as a Wi-Fi hotspot) to conserve cellular data use.

Embodiments of the described herein may be realized in any of various forms. For example, the systems and methods described herein may be realized as a computer-implemented method, a computer-readable memory medium, or a computer system, among other possibilities. Alternatively, the systems and methods described herein may be realized using one or more custom-designed hardware devices such as ASICs. As another alternative, the systems and methods described herein may be realized using one or more programmable hardware elements such as FPGAs. The systems and methods described herein may also be implemented using any combination of the above.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing handover of a mobile station (MS) between a base station (BS) and an access point (AP), comprising:
   at the MS:
      receiving one or more threshold values for reporting measurements of the AP to the BS, wherein the BS comprises a cellular BS, wherein the AP comprises a wireless local area network (WLAN) AP;
      determining one or more network quality values associated with the AP, wherein the one or more network quality values comprise uncalibrated values specific to the MS;
      converting the one or more network quality values to one or more calibrated network quality values;
      comparing the one or more calibrated network quality values to the one or more threshold values;
      performing handover based on the comparing.

2. The method of claim 1, wherein performing handover based on the comparing comprises:
   providing the one or more calibrated network quality values to the BS; and
   receiving a handover command from the BS in response to providing the one or more calibrated network quality values to the BS;
   performing handover from the BS to the AP according to the handover command.

3. The method of claim 2, wherein the handover command comprises a steering vector.

4. The method of claim 1, wherein the handover command applies to a subset of a plurality of data flows of the MS, wherein after performing handover a first one or more data flows remain with the BS and a second one or more data flows are switched from the BS to the AP.

5. The method of claim 1, wherein the one or more network quality values comprise a performance indicator based on a plurality of metrics.

6. The method of claim 1, wherein the one or more network quality values comprise a received channel power indicator (RCPI) of the AP.

7. The method of claim 1, wherein the one or more network quality values comprise a received signal to noise indicator (RSNI).

8. The method of claim 1, wherein the one or more network quality values comprises uplink and/or downlink speeds of the AP.

9. The method of claim 1, wherein performing handover from the BS to the AP is also based on load of the BS and/or AP.

10. A mobile station (MS), comprising:
    one or more radios, coupled to one or more antennas configured for wireless communication; and
    one or more processors operably coupled to the one or more radios;
    wherein the one or more processors are configured to operate with the one or more radios to:
       receive one or more threshold values for reporting measurements of an access point (AP) to a base station (BS), wherein the BS comprises a cellular BS, wherein the AP comprises a wireless local area network (WLAN) AP;
       determine one or more network quality values associated with the AP, wherein the one or more network quality values comprise uncalibrated values specific to the MS;
       convert the one or more network quality values to one or more calibrated network quality values;
       compare the one or more calibrated network quality values to the one or more threshold values;
       perform handover based on the comparing.

11. The mobile station of claim 10, wherein performing handover based on the comparing comprises:
    providing the one or more calibrated network quality values to the BS; and
    receiving a handover command from the BS in response to providing the one or more calibrated network quality values to the BS;
    performing handover from the BS to the AP according to the handover command.

12. The mobile station of claim 11, wherein the handover command comprises a steering vector.

13. The mobile station of claim 11, wherein the handover command applies to a subset of a plurality of data flows of the MS, wherein after performing handover a first one or more data flows remain with the BS and a second one or more data flows are switched from the BS to the AP.

14. The mobile station of claim 10, wherein the one or more network quality values comprise a performance indicator based on a plurality of metrics.

15. The mobile station of claim 10, wherein the one or more network quality values comprises uplink and/or downlink speeds of the AP.

16. The mobile station of claim 10, wherein performing handover from the BS to the AP is also based on load of the BS and/or AP.

17. An apparatus for configuration in a mobile station (MS), comprising:
    one or more processors, wherein the one or more processors are configured to:
       receive one or more threshold values for reporting measurements of an access point (AP) to a base station (BS), wherein the BS comprises a cellular BS, wherein the AP comprises a wireless local area network (WLAN) AP;
       determine one or more network quality values associated with the AP, wherein the one or more network quality values comprise uncalibrated values specific to the MS;
       convert the one or more network quality values to one or more calibrated network quality values;
       compare the one or more calibrated network quality values to the one or more threshold values;
       perform handover based on the comparing.

18. The apparatus of claim 17, wherein performing handover based on the comparing comprises:
    providing the one or more calibrated network quality values to the BS; and receiving a handover command from the BS in response to providing the one or more calibrated network quality values to the BS;

performing handover from the BS to the AP according to the handover command.

19. The apparatus of claim 18, wherein the handover command applies to a subset of a plurality of data flows of the MS, wherein after performing handover a first one or more data flows remain with the BS and a second one or more data flows are switched from the BS to the AP.

20. The apparatus of claim 17, wherein the one or more network quality values comprise a performance indicator based on a plurality of metrics.

* * * * *